United States Patent
Paton et al.

[11] 3,867,561
[45] Feb. 18, 1975

[54] ELECTRODE HOLDER OF THREE PHASE ELECTROSLAG PLANT

[76] Inventors: Boris Evgenievich Paton, ulitsa Kotsjubinskogo 9, kv. 21; Vladimir Konstantinovich Lebedev, ulitsa Engelsa 25, kv. 12; Igor Vladimirovich Pentegov, Zadorozhny pereulok 6, kv. 14; Vitaly Mikhailovich Baglai, ulitsa Semashko 10, kv. 54/3; Oleg Petrovich Bondarenko, ulitsa Kreschatik 15, kv. 34; Nikolai Fedorovich Medvedenko, ulitsa Vernadskogo 67, kv. 86; Boris Izrailevich Medovar, bulvar Lesi Ukrainki 2, kv. 8, all of Kiev; Pavel Petrovich Loskutov, ulitsa Uritskogo 17, kv. 8, Novosibirsk; Gennady Ivanovich Orlov, ulitsa Vatutina 27, kv. 20, Novosibirsk; Kim Moiseevich Khasin, ulitsa K.Marxa 35, kv. 17, Novosibirsk; Vladimir Ivanovich Lugovsky, ulitsa Petukhova 60, kv. 70, Novosibirsk; Valery Vasilievich Salmin, ulitsa Zorge 95, kv. 69, Novosibirsk; Vilen Fedorovich Marjuschenko, ulitsa Televizionnaya 11, kv. 7, Novosibirsk; Georgy Vasilievich Tamozhnikov, ulitsa Dekabristov 20, Novosibirsk, all of U.S.S.R.; Jury Andreevich Schelkunov, deceased, late of ulitsa Akademika Komarova 19a, kv. 87, Moscow, U.S.S.R. by Margarita Petrovna Schelkunova, administrator

[22] Filed: Jan. 19, 1973

[21] Appl. No.: 325,126

[52] U.S. Cl. .................................. 13/12, 13/14
[51] Int. Cl. ................................... H05b 7/10
[58] Field of Search .................. 13/9, 12, 13–17

[56] References Cited
UNITED STATES PATENTS

| | | | |
|---|---|---|---|
| 1,336,017 | 4/1920 | Bibby et al. | 13/12 |
| 1,370,489 | 3/1921 | Nye | 13/12 X |
| 3,665,081 | 5/1972 | Paton et al. | 13/12 |

Primary Examiner—R. N. Envall, Jr.
Attorney, Agent, or Firm—Holman & Stern

[57] ABSTRACT

An electrode holder comprising a support plate which carries consumable electrodes; current-carrying devices for supplying power to the electrodes, bus-bars connecting phase leads of each secondary winding of a power supply transformer and bus-bars connecting the midpoint of all the secondaries of the power supply transformer characterized in that the bus-bars, connected to the midpoints of the secondaries of the power supply transformer are connected in pairs at the point of connection to the midpoints with each bus-bar running parallel and in immediate proximity to the corresponding bus-bar connecting the phase leads of the secondary windings of the power supply transformer with the current-carrying devices for supplying power to the consumable electrodes. Thus it becomes possible to reduce reactance of compensating circuits and simplify the construction of the electrode holder.

2 Claims, 2 Drawing Figures

PATENTED FEB 18 1975 3,867,561

ELECTRODE HOLDER OF THREE PHASE ELECTROSLAG PLANT

BACKGROUND OF THE INVENTION

The present invention relates to electrometallurgy and more particularly to eletrode holders for three-phase electroslag plants.

Known in the prior art is a detachable electrode holder for a three-phase electroslag plant comprising a support plate carrying electrical insulators on which are mounted devices for feeding power to consumable electrodes, bus-bars and disconnectors which serve to connect windings of a power supply transformer (or transformers) to the electrode holder set up on a furnace.

Also known is a plant for simultaneous remelting of six electrodes located at the vertices of a regular hexagon and connected either to the secondary windings of three single-phase transformers forming a three-phase system or to the windings of a single three-phase transformer. In such a plant a uniform temperature field in a slag bath as well as the uniform melting of all electrodes mounted stationary with respect to each other are attained by connecting the secondary windings of each single-phase transformer to diametrically opposite electrodes and by connecting midpoints of the secondary windings with the aid of a bus-bar bifilar to bus-bars running from the winding ends with the bifilar bus-bar having a common (neutral) point at the centerpoint of the plant (mold) and insulated from the furnace structure.

The above plant suffers from substantial disadvantages as follows.

The midpoints of the secondary transformer windings of the detachable electrode holder are connected along the axis of symmetry of the plant which complicates appreciably the design of the detachable electrode holder.

Due to the same reason compensating circuits through which equalizing currents pass between the transformers have considerable inductance.

This results from the fact that the spacing between the busbars connecting the midpoints of the transformer secondaries and those feeding the condumable electrodes is larger than the thickness of current-carrying busbars.

SUMMARY OF THE INVENTION

It is an object of the present invention to eliminate the above drawbacks.

The present invention is directed to the provision of an electrode holder for a three-phase electroslag plant having minimum reactance of compensating circuits which ensures an increase in a linear melting rate of consumable electrodes together with self-regulation of the melting process and appreciable simplification of the construction of the electrode holders.

This is achieved by connecting the bus-bars running from the midpoints of secondary windings of a power supply transformer in pairs at the points of connection to the above midpoints with each bus-bar running parallel and in immediate proximity to the corresponding bus-bar wire which serves to connect phase leads of the transformer secondary with the current-carrying devices of the consumable electrodes.

It is also expedient to arrange both the bus-bars connecting the phase leads of the secondary winding of the power supply transformer with the aforesaid current-carrying devices and those connected to the midpoints of the seconary windings in a plane normal to a support plate.

The electrode holder according to the present invention is successful in achieving the foregoing objects; the above arrangement enables a substantial decrease in inductance of compensating circuits which tends to improve self-regulation in melting consumable electrodes and to simplify the construction of the electrode holder.

BRIEF DESCRIPTION OF THE DRAWINGS

To make the present invention more fully apparent a detailed description of a preferable exemplary embodiment of an electrode holder for a three-phase electroslag plant according to the invention is set out below taken with due reference to the accompanying drawings in which.

DETAILED DESCRIPTION OF PREFERRED EMBODIMENT

Figure 1:
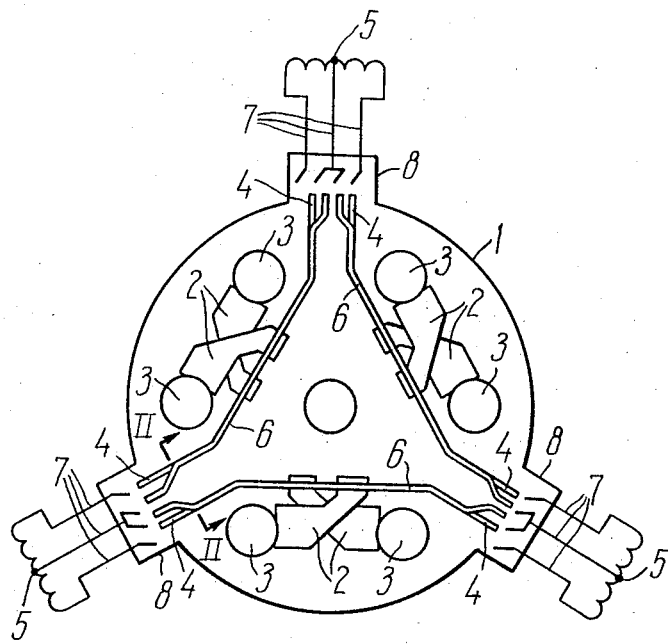
FIG. 1 is a plan view of a detachable electrode holder for a six-electrode electroslag plant with a diagrammatic representation of secondary windings of single-phase transformers.

An electrode holder incorporates support plate 1 carrying devices 2 for supplying power to standard elements 3 of consumable electrodes, bus-bars 4 connecting phase leads of each secondary 5 of single-phase power supply transformers (only their secondaries are shown in FIG. 1) with current-carrying devices 2 of two diametrically opposite consumable electrodes, and bus-bars 6 connecting leads running from the midpoints of all secondary windings 5 of the single-phase transformers.

Figure 2:
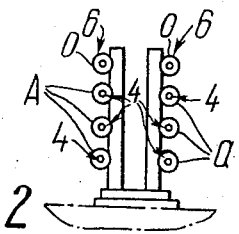
FIG. 2 shows a sectional view along line II—II of FIG. 1.

Bus-bars 4 and 6 (FIG. 2) are composed of water-cooled tubes disposed in one and the same plane normal to the support plate in parallel with one another. They are designed in the form of tube banks with the tubes running in immediate proximity to each other.

Each branch comprises those tubes connected to one end of secondary 5 of the single-phase power transformer (phase tubes) for example to the beginning of "A" winding or to the end of "a" winding, and tubes connected to the midpoint of secondary 5 of the single-phase power transformer - zero tubes "o." Each branch is made up of the same number of tubes. The tube banks terminate with plates connected to current-carrying bus-bar 7 of the single-phase power transformer with the aid of disconnectors 8 whose purpose is to establish an electrical contact between bus-bars 7 and bus-bars 4 and 6 on the principle of a bench vice.

Due to the conclusion of disconnectors 8 the electrode holder can be easily connected or disconnected from the power transformers after stripping or when installing it on an electroslag furnace.

The compensating circuits of the electrode holder have minimum inductance. This is achieved by assembling the tubes of phase bus-bar wires A $a$ and zero tubes $o$ in a single bank. By arranging the tubes with a minimum spacing between them it is possible to decrease substantially the length of the circuit through which runs the magnetic field and, hence, the inductance of the above bus-bars. Hence the linear rate of melting of the consumable electrodes increases appreciably during melting in a three-phase electroslag plant with self-regulation of the process. In addition, the use of the tubes (phase and zero) assembled in a single bank simplifies substantially the design of the electrode holder since it becomes possible to dispense with the unit for connecting the midpoints of secondary windings 5 of the power transformers at the center of the electroslag plant.

The design of the electrode holder of the instant invention allows a three-phase electroslag plant to be fed either with the aid of three single-phase transformers as outlined above or by a three-phase power transformer. In the later case it would be preferable to arrange the power three-phase transformer above the electroslag plant.

The electrode holder of the instant invention is disclosed by considering an embodiment applicable for the simultaneous remelting of six consumable electrodes. But it can be easily adopted for remelting a number of electrodes which number is divisible by six.

We claim:

1. An electrode holder for a three-phase electroslag plant comprising: a support plate for carrying a plurality of consumable electrodes affixed thereto the number of which is divisible by six each one of said electrodes being located at the vertices of a regular polygon and insulated from said support plate; a plurality of current-carrying devices each for supplying power to alternately disposed pairs of said consumable electrodes and mounted on said support plate; first bus-bars for connecting phase leads of each secondary winding of a transformer means operatively associated with the electrode holder, with respective ones of said current-carrying devices supplying power to each alternately disposed pair of consumable electrodes in the polygonal array; second bus-bars for interconnecting the midpoints of the secondaries of said transformer means, said second bus-bars being connected in pairs at the points of connection to said midpoints on the transformer secondaries and running paralell with and in immediate proximity to corresponding respective ones of said first bus-bars connecting the secondary windings of said transformer means with said current-carrying devices.

2. An electrode holder as claimed in claim 1 in which said first and second bus-bars are disposed in a plane normal to said support plate.

* * * * *